Feb. 10, 1970    W. C. HORAK ET AL    3,494,373
FROSTPROOF HYDRANT
Filed Feb. 28, 1966    2 Sheets-Sheet 2

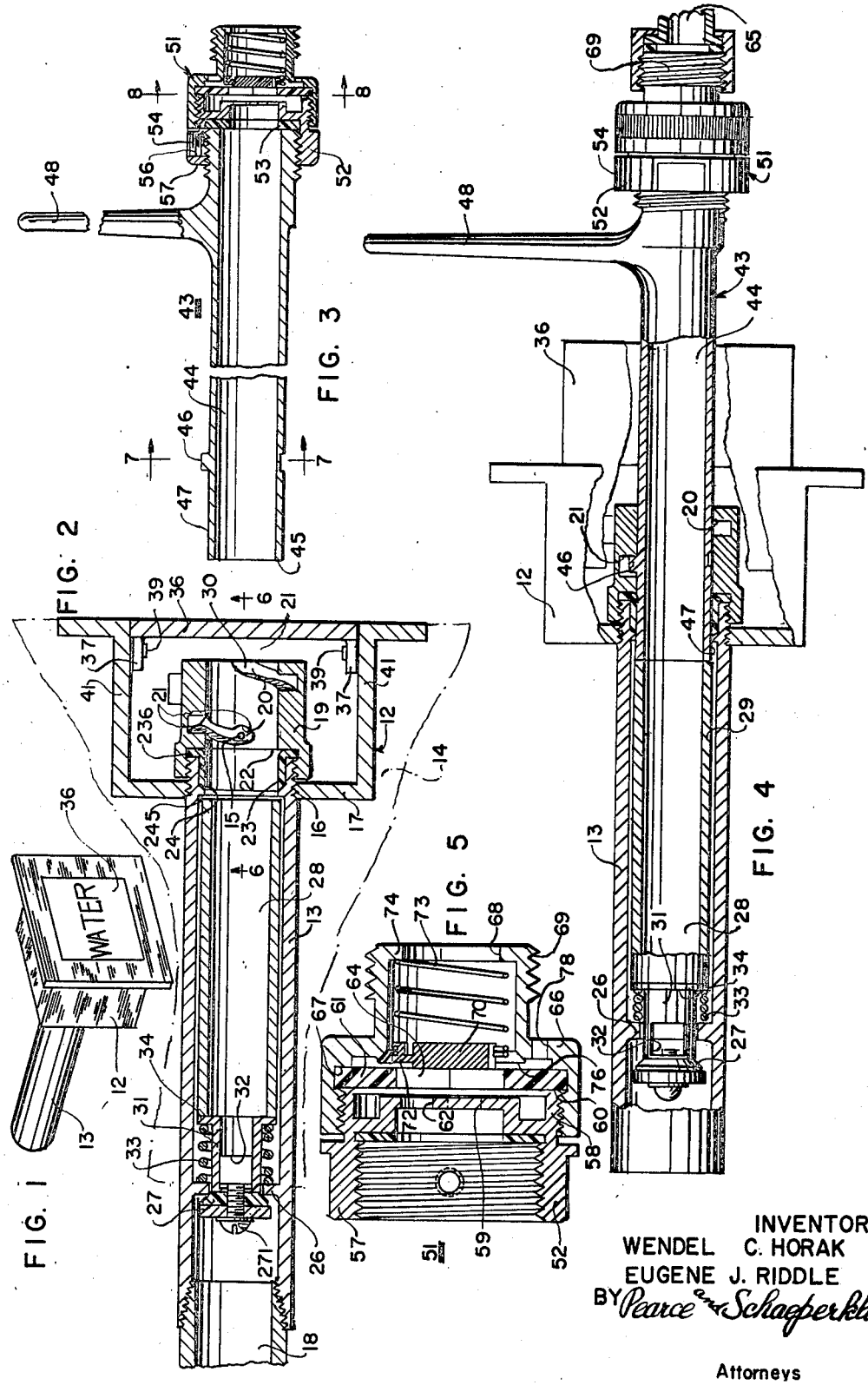

INVENTOR
WENDEL C. HORAK
EUGENE J. RIDDLE
BY Pearce Schaeperklaus
Attorneys

United States Patent Office 3,494,373
Patented Feb. 10, 1970

3,494,373
FROSTPROOF HYDRANT
Wendel C. Horak, Ludlow, Ky., and Eugene J. Riddle, Cincinnati, Ohio, assignors to The Murdock Manufacturing and Supply Company, Cincinnati, Ohio, a corporation of Ohio
Filed Feb. 28, 1966, Ser. No. 530,608
Int. Cl. E03c *9/10;* F16l *29/00;* F16k *51/00*
U.S. Cl. 137—217                                  12 Claims

ABSTRACT OF THE DISCLOSURE

A vandalism and tampering damage resistant frostproof sanitary hydrant in which the valve is actuated by cooperation with a removable valve-operator and spout.

---

This invention relates to frostproof sanitary hydrants. More particularly, this invention relates to a frostproof sanitary hydrant for use as a sill cock having a permanently installed valve housing and valve and a removable valve operator.

An object of this invention is to provide a frostproof sanitary hydrant having a valve portion located in a frost-free location as inside a building or the like and having a valve disc which normally closes the valve inside the building and in which water which has passed the valve disc can drain away from the valve disc when the valve is not in use.

A further object of this invention is to provide a vandalism and tampering damage resistant frostproof hydrant of this type in which the valve is actuated by a valve operator and spout having an end portion which releasably engages a valve actuating member and can hold the valve disc in selected positions in which it is correspondingly opened to a predetermined degree when liquid is being delivered through the valve.

A further object of this invention is to provide a frostproof hydrant of this type in which the hydrant cooperates with the valve operator to retard movement of the latter closing of the valve, so the valve does not slam shut and produce water hammer.

A further object of this invention is to provide a frostproof hydrant of this type in which the valve disc is supported on a hollow tubular actuator and in which the valve operator includes a tubular portion which engages the actuator for opening and operating the valve.

A further object of this invention is to provide a frostproof hydrant of this type in which the tubular actuator cooperates with the valve body to mechanically limit compression of the valve disc against the seat.

A further object of this invention is to provide a frostproof hydrant of this type in which the hydrant has a helical keyway provided annularly of the valve operator receiving passage and the valve operator is provided with an outwardly projecting key-lug which cooperatingly extends into the keyway whereby the degree of opening of the valve corresponding to longitudinal advancement of the operator is correlated to rotational positioning of the operator.

A further object of this invention is to provide a frostproof hydrant of this type in which the keyway is widened at selected stations to provide recesses into which forces tending to urge the valve closed also tend to urge the key-lug with resultant retardation of closing of the valve or stopping and retaining the key-lug and operator in a position in which the valve is held at a predetermined degree of openness.

Another object of this invention is to provide a frostproof hydrant of this type in which the valve operator has a vacuum breaker and is attachable to a hose for quickly connecting and disconnecting the hose to the hydrant and preventing back siphonage of liquid from and through the hose into the hydrant while connected to the hydrant.

The above and other objects and features of the invention will in part be obvious and in part be apparent to those having ordinary skill in the art to which this invention pertains from the following detailed description and the drawings, in which:

FIG. 1 is a perspective view of a stationary or housing portion of a frostproof sanitary sill-cock type hydrant constructed in accordance with what presently appears to be a preferred embodiment of this invention;

FIG. 2 is a view in lengthwise horizontal section of the portion of the hydrant illustrated in FIG. 1, portions of a wall surrounding same being indicated in dot-dash lines;

FIG. 3 is a view in lengthwise section of a valve operator which forms a part of the frostproof hydrant;

FIG. 4 is a top plan view partly in lengthwise horizontal section of the housing of the valve, the valve operator with the valve being shown in an open position;

FIG. 5 is an enlarged view in lengthwise section showing a vacuum breaking fitting which forms a part of the valve operator;

In the following detailed description and the accompanying drawings, like reference characters indicate like parts.

Figure 9:
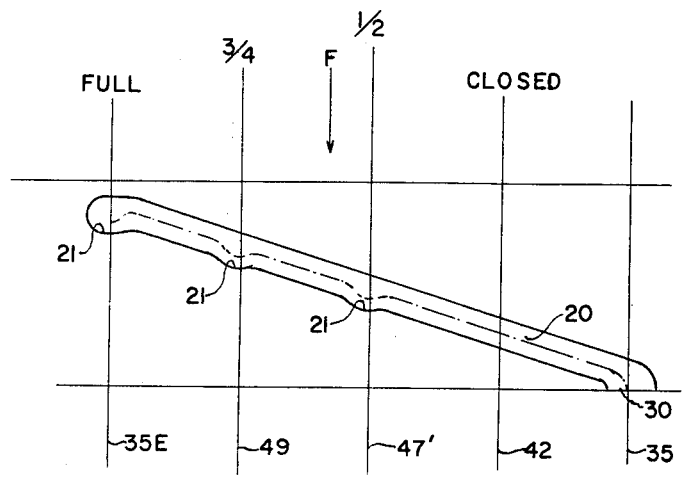
FIG. 9 is a schematic layout of a keyway of which portions are shown in FIGS. 2 and 4.

In FIGS. 1, 2, and 4 is shown a sill-cock hydrant which includes a box 12 and a tubular housing 13 which can be disposed in the wall of a building or the like 14 as indicated in FIG. 2. The tubular housing 13 is threadedly attached to the box 12 and received in a threaded opening 16 in a rear wall 17 of the box. Water under pressure is supplied to the housing 13 through a supply pipe which may by a union 18 be attached to an end of the housing 13 remote from the box 12. Such union precludes withdrawal of the hydrant outwardly through the wall and may be opened and valve disc 27 with screw 271 removed therethrough for renewal of the bib and reinstallation.

Inside the box 12, the housing 13 carries a hollow fitting 19 having an external lug 25 and a helical internal groove 20 provided with a drain hole 15 adjacent its closed end and with stop portions or enlargements 21. The fitting 19 is threadedly mounted on the housing 13 and includes an annular shoulder portion 22 which compressively engages a radial flange portion 236 of packing ring 23 supported by the radial end face of housing 13 and integral with a sleeve portion of ring 23 extending inside the tubular housing 13. The inner end portion of the packing ring 23, remote from the flange 236, engages a frusto-conic shoulder surface 24 inside the housing and, as the fitting 19 is tightened on the housing 13 as with a key or spanner engaging lug 25, the inner end portion of the packing ring 23 is urged against the frusto-conic surface 24 and inwardly thereby.

Inside the housing 13 is formed an inwardly directed annular flange 26 which forms a seat for a valve disc 27. The valve disc 27 is mounted on a valve actuator member or stem 28 which includes a tubular main portion 29 and valve supporting cup portion 31 at the inner end thereof. Water can enter the tubular interior of the valve actuator member 28 through windows 32 in the cup portion 31. The windows 32 receive liquid from the inlet end of housing 13 when the valve is open. A compression spring 33 which bears on the flange 26 and on a shoulder 34 contiguous to the cup portion 31 urges the valve disc 27 and the valve actuator member 28 to valve closed position in which the bib portion of the valve disc 27 is seatingly compressed against flange 26. To limit the compression of the bib against flange 26, the end of the tubular main portion 29 remote from the bib may be so spaced from the latter as to engage should face 245 of housing 13 and mechanically limit movement of valve disc 27 toward flange 26.

Figure 6:
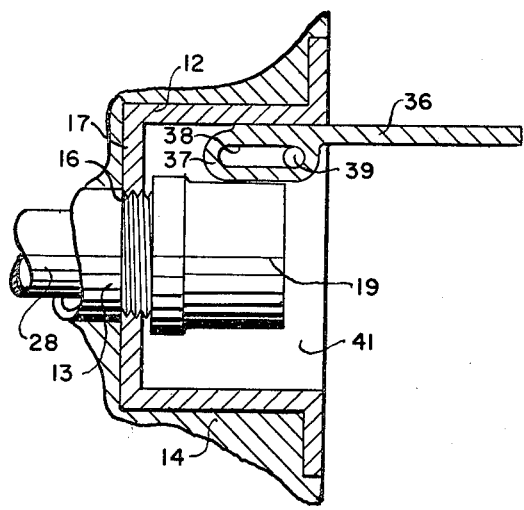
FIG. 6 is a view in section taken on the line 6—6 in FIG. 2.

When the valve is closed, the outer end of the housing 13 and the fitting 19 are enclosed in the box 12. The box 12 is provided with a cover 36 which normally closes the box. The cover 36 includes downwardly and inwardly extending lugs 37 having slots 38 therein (one of which is shown in FIG. 6). The slots receive pins 39 which are mounted in side walls 41 of the box. The cover 36 can be swung outwardly and upwardly from the closed position shown in FIGS. 1 and 2 to a horizontal open position and then slid into the box to the position of FIGS. 4 and 6 in which it cooperates with the underside of the top 40 of box 12.

Figures 7, 8:
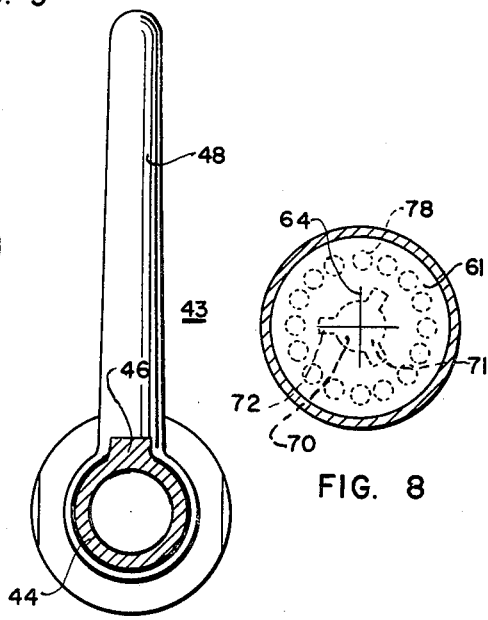
FIG. 7 is a view in section taken on the line 7—7 in FIG. 3.
FIG. 8 is a view in section taken on the line 8—8 in FIG. 3.

When the cover 36 is in open position, the valve can be opened by means of a key or valve operator 43. The valve operator 43, as shown in FIGS. 3, 4 and 7, includes a tubular body 44 provided with an end face 45 (FIG. 3) engageable with the free end of the main portion 29 of the valve actuator 28, as shown in FIG. 4. The engaging portions of the valve actuator and the operator have interior or internal bores of substantially equal diameter and circular cross section so that liquid can flow smoothly therebetween. A section 47 of the body adjacent the end 46 is received inside the packing ring 23 and forms a seal therewith. Outboard of the sealing section, the body 44 carries an outwardly projecting lug 46. As shown in FIG. 4, the lug 46 is receivable in the helical groove 20 and can drop and be received in the enlargements 21 thereof. Lug 46 is urged to rest and remain in the enlargements 21 by force acting in the direction of arrow F in FIG. 9 and supplied mechanically by spring 33 and hydraulically by water urging the valve disc 27 to seat and thus to hold the valve operator in selected positions with the valve at the selected open positions. In the illustrative embodiment the helical groove 20 extends for substantially one revolution. Lug 46 is insertable into groove end 30 at the bottom center line 35 of the front end of fitting 19 (FIGS. 2 and 9). As valve operator 43 is rotated, lug 46 travels along groove 20, taking up slack for about one quarter turn to the valve closed station 42. Further rotation an additional one-quarter turn to station 47' to drop lug 46 into recess 21 at station 47 moves the valve to one-half open condition, while additional similar movement to the recess 21 at station 49 places the valve in three-quarters open condition. When lug 46 is in recess 21 at station 35E, the valve is fully open. An outwardly extending horn 48 integral with the operator body 44 makes possible ready turning thereof. However, recesses 21 and the frictional drag resulting from forces in direction F prevent rotation of the valve operator at a speed which results in the valve being closed so rapidly that water-hammer would result.

At the outer end of the operator body 44 is mounted a vacuum breaker assembly 51 (FIGS. 3 and 4). The vacuum breaker assembly 51 includes a cup-shaped cap 52 which is threaded on the outer end of the operator body 44 and sealed thereto by a washer 53 (FIG. 3). A set screw 54 extending through a transverse opening 56 in a wall 57 of the cap 52 holds the cap in position on the operator body 44. Details of construction of the vacuum breaker assembly 51 are shown in FIG. 5. The cap 52 is provided with an externally threaded skirt 58 extending outboard of a base 59 of the cup-shaped cap 52. The skirt 58 terminates in an annular edge 60 which engages a flat flexible diaphragm 61 adjacent an outer edge thereof. Liquid under pressure can reach the diaphragm 61 through openings 62, only one of which is shown, in the base 59 of the cup-shaped cap 52 and can pass through a cross-shaped slit 64 (FIG. 8) in the diaphragm 61 centrally thereof. The diaphragm 61 is held in place by a housing 66 mounted on the skirt 58 in threaded relation therewith. A shoulder 67 on the housing engages the diaphragm and holds the outer portion of the diaphragm against the edge 60.

The housing 66 is provided with a discharge opening 68 through which liquid can be delivered. External threads 69 on the housing surrounding the opening 68 permit attachment of a hose or the like 65 (FIG. 4) for receiving the liquid.

Inside the housing 66 is mounted a spring-pressed spider member 70 having a central disc portion 71 (FIG. 8) and outwardly extending bifurcated lugs 72 (FIG. 5). A compression spring 73 is mounted inside the housing 66 with one end of the spring 73 being received in the bifurcated lugs 72 and the other end of the spring 73 engaging a shoulder 74 which surrounds the discharge opening 68. When the diaphragm 61 is in the position shown in FIG. 5, vent openings 78 in the housing communicate with the interior of the housing to admit air to break any vacuum which may form therein on the hose side of the diaphragm. The spring-pressed spider member normally holds the diaphragm 61 in this position. However, when liquid under pressure is being supplied through cup-shaped cap 52 to the interior of the housing 66, the diaphragm 61 is moved into engagement with an annular flange 76 inside the housing which seals off the openings 78 to prevent liquid flow therethrough at such times.

Therefore, what we claim as new and desire to secure by Letters Patent, is:

1. A frostproof hydrant which comprises a tubular housing, a tubular valve actuator mounted in said housing for movement lengthwise thereof, an inwardly directed valve seat surrounding said valve actuator, a valve disc mounted on said valve actuator and engageable with the valve seat to close the valve, there being an opening in the valve actuator adjacent the valve disc to permit entry of liquid from the housing into the interior of the valve actuator when the valve is open, means for resiliently urging the valve actuator and the valve disc to valve closed position, there being a helical interior groove in the housing remote from the valve seat, a tubular valve operator, said operator having an end portion receivable inside the housing and engageable with the valve actuator with the interior of the valve actuator and the interior of the operator being in communication, an outwardly directed lug on the operator receivable in the helical groove of the housing, and a plurality of stop means in said groove for engaging the lug to hold the operator in selected positions with the operator and valve actuator in selected open position.

2. A hydrant as in claim 1 wherein there is means on the operator for attaching a hose thereto to receive liquid therefrom.

3. A hydrant as in claim 2 wherein the means for attaching a hose to the hydrant includes a vacuum breaker.

4. A hydrant as in claim 1 wherein the valve actuator and the operator have internal bores at the engaging portions of substantially equal diameters and circular cross sections.

5. A hydrant as in claim 1 wherein means is provided in the housing for forming a seal surrounding the valve operator when the valve operator engages the valve actuator.

6. A hydrant as in claim 5 wherein the valve operator has a vacuum breaker included in the fluid passage extending therethrough to limit movement of fluid through said valve operator to movement away from said valve when said valve is open.

7. A frostproof hydrant which comprises a hollow housing having an inlet port and an outlet port, a valve actuator mounted in said housing for movement therein, said housing having a valve seat adjacent said inlet port and annularly of said valve actuator, a valve disc mounted on said valve actuator and engageable with the valve seat to close the valve, a valve operator having a fluid passage extending therethrough insertable into said housing through said outlet port, means including a cam follower and a cam having a plurality of stop means each for holding the cam follower at preselected open positions for detachably coupling said valve operator to said housing and correlating relative movement of the operator to the housing, said operator being advanceable into operative engagement with said valve actuator to actuate same to unseat said valve as desired, a seal mounted in said housing for annularly cooperating in sealing relation with said valve operator whereby said valve may be opened by said valve operator and fluid discharged through said valve operator fluid passage and said operator withdrawn from said body after the valve is closed.

8. A hydrant as in claim 7 wherein the means detachably coupling said valve operator to said body and correlating relative movement of the operator to the body comprise a cam follower on the actuator and a cam on the housing.

9. A hydrant as in claim 8 wherein the cam has station portions with which the cam follower tends to remain in cooperation to hold the valve in a predetermined unseated position and with which the cam follower cooperates to retard the speed of valve closing by said operator to speeds lower than those at which water-hammer occurs.

10. A hydrant as in claim 8 wherein the valve operator has means for attaching a hose thereto to receive fluid from the fluid passage in said valve operator.

11. A hydrant as in claim 8 wherein the valve operator has a vacuum breaker included in the fluid passage extending therethrough to limit movement of fluid through said valve operator to movement away from said valve when said valve is open.

12. A hydrant as in claim 7 wherein the hollow housing is mountable in a wall with the valve disc in a non-freezing zone, the outlet port in a protective enclosure having an access door closeable when the said valve operator is removed from said hydrant, and the housing from said valve seat to said outlet port being positioned so that freezable fluid drains from locations therein in which it would interfere with valve operation if frozen.

References Cited

UNITED STATES PATENTS

| | | | |
|---|---|---|---|
| 2,265,267 | 12/1941 | Cowles | 251—149.6 |
| 2,652,224 | 9/1953 | Noland | 137—360 |
| 2,919,146 | 12/1959 | Gill | 251—149.8 X |
| 3,106,935 | 10/1963 | Gatzke | 137—360 X |
| 3,175,575 | 3/1965 | Kennedy | 137—360 |
| 2,545,620 | 3/1951 | Lamoureux | 137—323 |

WILLIAM F. O'DEA, Primary Examiner

D. R. MATTHEWS, Assistant Examiner

U.S. Cl. X.R.

137—322, 360; 251—149.6